United States Patent [19]
Tomita

[11] Patent Number: 4,891,711
[45] Date of Patent: Jan. 2, 1990

[54] DOCUMENT READER FOR A DIGITAL COPIER

[75] Inventor: Kan Tomita, Kawasaki, Japan

[73] Assignee: Ricoh Company, Ltd., Tokyo, Japan

[21] Appl. No.: 263,809

[22] Filed: Oct. 28, 1988

[30] Foreign Application Priority Data

Oct. 29, 1987 [JP] Japan .................................. 62-274099

[51] Int. Cl.$^4$ ............................................. H04N 1/04
[52] U.S. Cl. ..................................... 358/448; 358/494
[58] Field of Search .............. 358/256, 285, 293, 294, 358/296, 297

[56] References Cited

U.S. PATENT DOCUMENTS

| | | | |
|---|---|---|---|
| 4,486,786 | 12/1984 | Sato et al. | 358/285 |
| 4,538,185 | 8/1985 | Wiggins | 358/285 |
| 4,675,741 | 6/1987 | Shinohara | 358/256 |
| 4,763,200 | 8/1988 | Nakatani | 358/285 |

FOREIGN PATENT DOCUMENTS 63-246965 10/1988 Japan .
63-252063 10/1988 Japan .

*Primary Examiner*—Edward L. Coles, Sr.
*Assistant Examiner*—Jerome Grant
*Attorney, Agent, or Firm*—Oblon, Spivak, McClelland, Maier & Neustadt

[57] ABSTRACT

A document reader applicable to a digital copier or similar image recording apparatus capable of reading any of a reflective and a transmissive document as desired. An effective image area smaller than an effective image area assigned to a reflective document is defined on a glass platen for a transmissive document. When a transmissive document is read, light transmitted through a differential area defined by the difference between the two effective image areas is sensed in the form of a reference voltage for the output voltages of an image sensor. The output of the image sensor is normalized for each main scanning on the basis of the reference voltage.

5 Claims, 4 Drawing Sheets

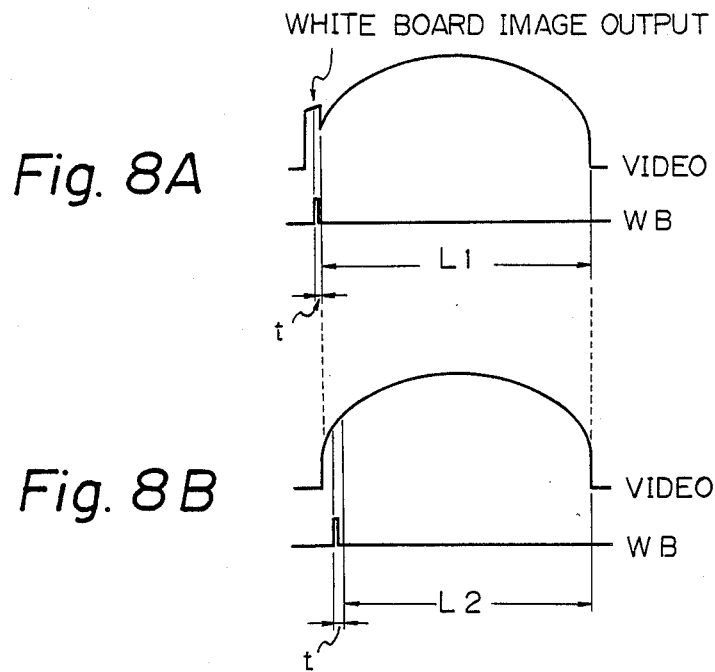
*Fig. 8A*
*Fig. 8B*
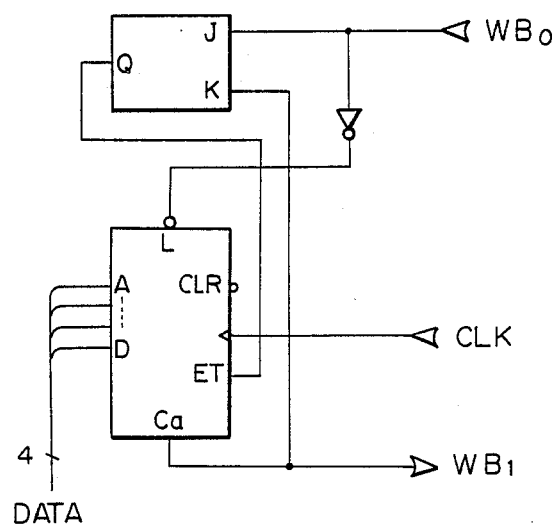
*Fig. 9*

DOCUMENT READER FOR A DIGITAL COPIER

BACKGROUND OF THE INVENTION

The present invention relates to a document reader for use with a digital copier or similar image recording apparatus and, more particularly, to a document reader capable of reading a document which may be either transmissive or reflective.

A document reader used with a digital copier, for example, customarily includes a reference member having predetermined density which is located in close proximity to one end of a glass platen adapted to load a document. A reflection from the reference member is routed through optics to a CCD (charge coupled device) array or similar image sensor and sensed by a part of the image sensor to be converted into an electric signal. This electric signal is used to stabilize the voltages of a video signal which is outputted by the image sensor with respect to the subscanning direction. More specifically, the voltages of a video signal are stabilized despite any change in the output light of a light source such as a fluorescent lamp in the subscanning direction. With some modern document readers, an extra light source device is available for exclusively reading a transmissive document in distinction from the above-mentioned reflective document. A problem with this kind of scheme is that when the exclusive light source device is mounted on a document reader to read a transmissive document, it is impossible to stabilize the voltages of a video signal because the irregularity in the output light of the light source device in the subscanning direction is neglected. Such a problem may be eliminated by stabilizing the quantity of light issuing from the light source or by illuminating a transmissive document uniformly. Nevertheless, when the light source is implemented by a fluorescent lamp, for example, it is necessary to provide extra devices for controlling the current to be applied to the lamp and the temperature of the lamp, a reflector having an accurate configuration, etc. This results in an increase in cost and, yet, incomplete compensation.

SUMMARY OF THE INVENTION

It is therefore an object of the present invention to provide a document reader for a digital copier capable of producing a stable video signal which is free from irregularities in the subscanning direction, despite the use of a simple light source device for reading transmissive documents.

It is another object of the present invention to provide a generally improved document reader for a digital copier.

In accordance with the present invention, in a document reader for sensing, when reading a transmissive document, a reflection from a reference member of a predetermined color and having predetermined density and locate outside an effective image area assigned to a reflective document on a glass platen as a reference voltage for output voltages of an image sensor and, based on the reference voltage, normalizing an output associated with each scanning, an effective image area narrower than the effective area assigned to a reflective document is defined for a transmissive document so that, when a transmissive document is read, light transmitted through a differential area defined by a difference between the two effective image areas is sensed in the form of a reference voltage, and a timing for sensing the reference voltage is changed.

BRIEF DESCRIPTION OF THE DRAWINGS

The above and other objects, features and advantages of the present invention will become more apparent from the following detailed description taken with the accompanying drawings in which:

FIG. 8A shows the waveform of an output signal of a CCD image sensor appearing when the document reader in accordance with the present invention reads a reflective document;

FIG. 8B is a view similar to FIG. 8A, showing the waveform of the CCD image sensor appearing when the document reader of the present invention reads a transmissive document;

FIG. 9 is a schematic block diagram showing a circuit for delaying a white board pulse included in the document reader of the present invention.

DESCRIPTION OF THE PREFERRED EMBODIMENT

Figure 1:
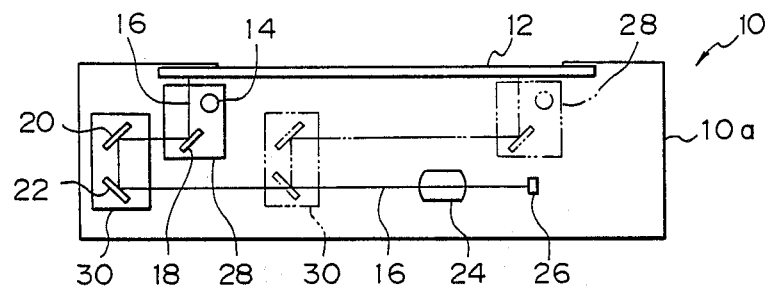
FIG. 1 is a section showing a prior art document reader installed in a digital copier or similar image recording apparatus.

To better understand the present invention, a brief reference will be made to a prior art document reader for a digital copier, shown in FIG. 1. In the figure, the document reader generally designated by the reference numeral 10 includes a light source in the form of a fluorescent lamp 14. The lamp 14 illuminates a reflective document (not shown) which is laid on a glass platen 12 which is in turn mounted on the top of a body 10a of the document reader 10. A reflection 16 from the document is sequentially routed through a first mirror 18, a second mirror 20, a third mirror and a lens 24 to become incident to a CCD array 26 which serves as an image sensor. The lamp 14 and first mirror 18 are mounted on a first carriage 28 while the second mirror 20 and third mirror 22 are mounted on a second carriage 30. The second carriage 30 is moved at half the speed of the first carriage 28 to maintain the optical path between the document and the CCD image sensor 26 constant. The first and second carriages 28 and 30 scan the document while the document is read.

Figure 2:
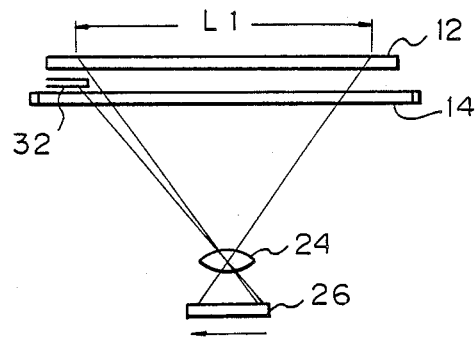
FIG. 2 is a view demonstrating how to stabilize a video signal with the prior art document reader.
Figure 3:
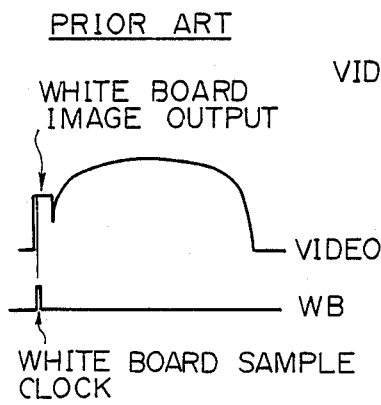
FIG. 3 shows the waveform of an output signal of a CCD image sensor included in the document reader of FIG. 1 and produced when a reflective document is read.
Figure 4:
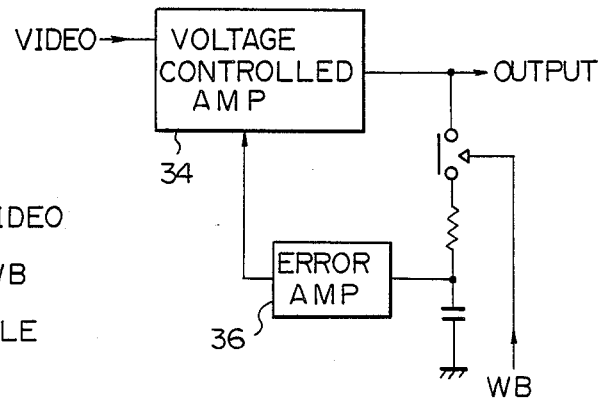
FIG. 4 is a schematic block diagram showing a specific construction of a circuit for stabilizing a video signal.

With such a document reader 10, it is a common practice to locate a reference member having predetermined density in the vicinity of one end of the glass platen 12. Light reflected by the reference member is sensed by a part of the CCD image sensor 26 and, based on the resulting output of that part of the image sensor 26, a video signal outputted by the image sensor 26 is stabilized in the subscanning direction. More specifically, as shown in FIG. 2, a white board 32 serving as the reference member is mounted on the front part of the first carriage 28 with respect to the main scanning direction, so that the image sensor 26 reads the white board 32 and then the document on the glass platen 12. The resulting output of the image sensor 26 is shown in FIG. 3. An arrangement is made such that a white board pulse WB appears when the image sensor 26 reads the white board 32. As shown in FIG. 4, a voltage controlled amplifier 34 holds a voltage of a video signal VIDEO which is associated with the white board 32 in response to the white board pulse WB and, based on this voltage, constantly sets the gain of the video signal VIDEO. This allows the output of the circuit shown in FIG. 4 to remain stable even if the output light of the lamp 14 changes in the subscanning direction. In FIG. 2, $L_1$ is representative of an effective image area assigned to a reflective document. In FIG. 4, the reference numeral 36 designates an error amplifier.

Figure 5:
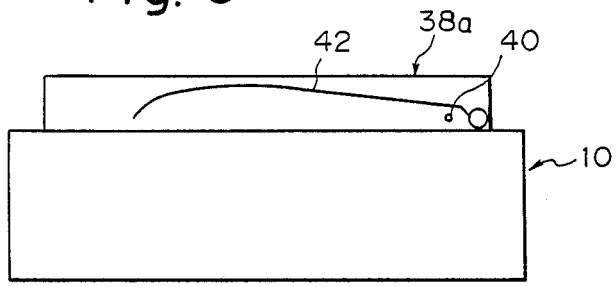
FIGS. 5 and 6 are elevations each showing a different light source device available for reading transmissive documents.
Figure 6:
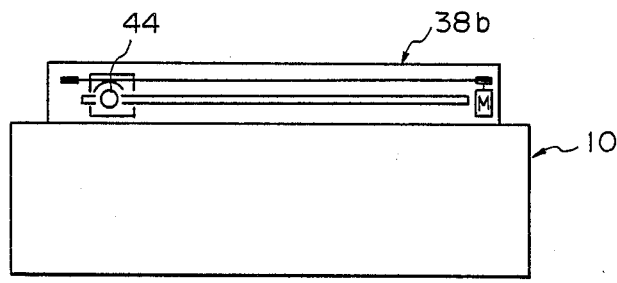

The document reader 10 shown in FIG. 1 may be equipped with an extra light source device for reading transmissive documents such as shown in FIG. 5 or 6. In FIG. 5, the extra light source device labeled 38a uses a wire-like light source 40 and a reflector 42 so as to illuminate a transmissive document substantially uniformly in the subscanning direction. In FIG. 6, the extra light source device 38b is constructed such that a light source in the form of a fluorescent lamp 44 is movable in association with a subscanning stroke of the light source 38b. In the case that the exclusive light source device 38a or 38b is mounted on the document reader 10 for reading a transmissive document, it has been customary to disenable the circuit shown in FIG. 4 to thereby read such a document by neglecting the irregularities of output light in the subscanning direction. It has been impractical therefore to stabilize the video signal with respect to voltage. While various approaches have heretofore been proposed to stabilize the video signal as stated earlier, none of them has been fully satisfactory.

A preferred embodiment of the document reader in accordance with the present invention will be described in detail with reference to the accompanying drawings.

Figure 7:
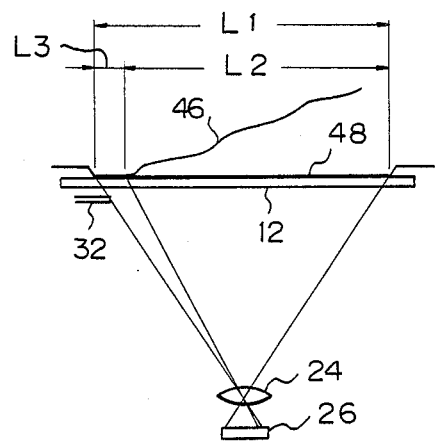
FIG. 7 is a schematic view showing a document reader embodying the present invention.

In the preferred embodiment, in a document reader on which an extra light source device for reading transmissive documents may be mounted as with the document reader of FIG. 1, for a reflective document a reflection from the white board 32 is sensed in the form of a reference voltage for the output voltages of the CCD image sensor 26 as has been the case with the prior art of FIG. 2. In the case of a transmissive document, it is impossible to produce an output associated with a reflection from the white board 32. Hence, as shown in FIG. 7, light from the light source of an exclusive light source device which has been transmitted through a part of the effective image area $L_1$ assigned to a reflective document is sensed as a reference voltage for the output voltages of the image sensor 26. More specifically, an exclusive effective image area $L_2$ slightly narrower than the effective image area $L_1$ is defined on the glass platen 12 for a transmissive document. When a transmissive document is read, light propagated though a differential area $L_3$ resulting from the difference between the two effective image areas $L_1$ and $L_2$ is incident to the image sensor 26 and the resulting output of the image sensor 26 is used for a reference voltage associated with the main scanning direction. To prevent a transmissive document from covering the differential area $L_3$ on the glass platen 12, two diffusion plates (or transparent plates) 46 and 48 having no directivity are provided on the glass platen 12. The two diffusion plates 46 and 48 are adhered to each other only in the differential area $L_3$ to inhibit a document from entering the area $L_3$ and are not adhered in the area $L_2$. A transmissive document may be inserted between the diffusion plates 46 and 48 by moving or opening the diffusion plate 46 away from the diffusion plate 48. Such an implementation allows a transmissive document to be positioned only in the exclusive effective area $L_2$ with accuracy.

In the above construction, light issuing from the light source of an extra light source device for transmissive documents is partly incident to the CCD image sensor 26 via the area $L_3$ and sensed as a reference voltage. Based on this reference voltage, the gain of an output video signal is selected for each main scanning so that the resulting video signal is maintained stable with no regard to irregularities in the quantity of light in the subscanning direction.

FIGS. 8A and 8B show a relationship between the video signal VIDEO and the white board pulse WB with respect to a reflective document and a transmissive document, respectively. As shown in FIG. 8A, when a reflective document is read, an image output representative of the white board 32 appears and a white board pulse WB appears while the image output is present, the gain of the video signal VIDEO being controlled on the basis of the voltage associated with the white board 32. On the other hand, the output associated with the white board 32 is zero (light is not transmitted) when a transmissive document is read. At this time, as shown in FIG. 8B, the white board pulse WB is shifted to the effective image area $L_1$ assigned to a reflective document and a document is inhibited from covering the area $L_1$. In such a condition, any irregularity in the quantity of light is read as it is. It is to be noted that the effective image areas $L_1$ and $L_2$ are each so configured as to begin with a delay of a period of time t relative to the white board pulse WB.

Figure 10:
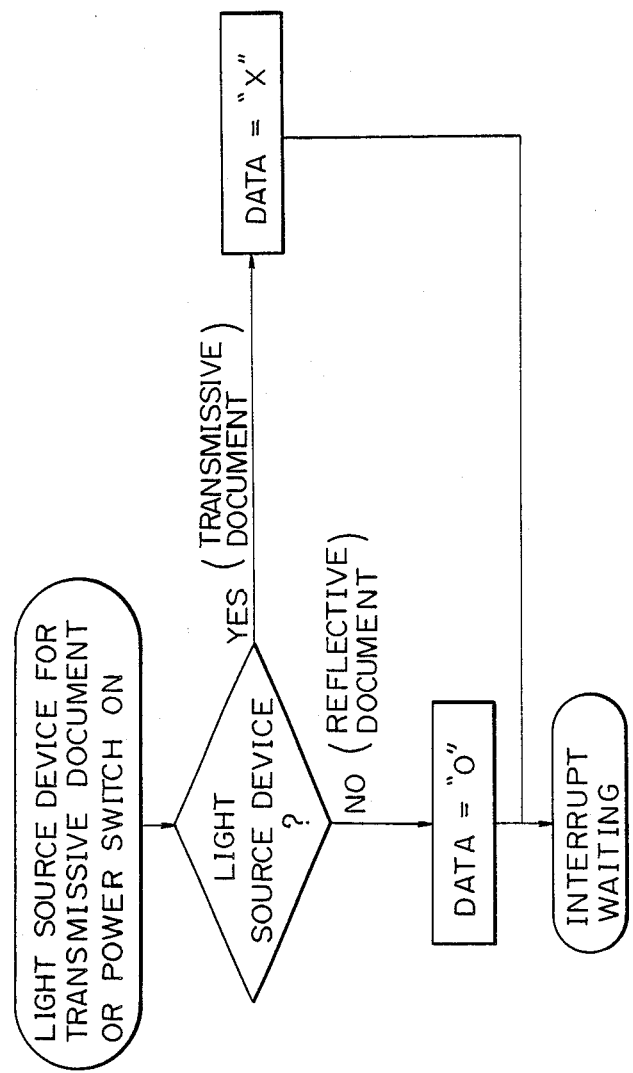
FIG. 10 is a flowchart representative of the operation of the document reader in accordance with the present invention.

Referring to FIGS. 9 and 10, a circuit and a sequence for delaying the white board pulse WB by a predetermined period of time are shown. As shown in FIG. 10, whether the document to be read is transmissive or reflective is determined when the exclusive light source device for transmissive documents is mounted or dismounted or when a power switch is turned on. Depending upon the result of decision, data DATA for determining a delay of the white board pulse WB is selected. If desired, the discrimination of a transmissive document and a reflective document may be implemented by a switch. Then, based on the delay data DATA selected as mentioned above, a basic white board pulse $WB_0$ is delayed by a predetermined period of time by the circuit of FIG. 9, thereby producing a delayed white board pulse $WB_1$.

In summary, it will be seen that the present invention provides a document reader which produces a stable video signal free from irregularities in the subscanning direction even when use is made of a relatively simple exclusive light source device for transmissive documents which lacks an accurate light quantity stabilizer, an accurate reflector, etc. This unprecedented advantage is derived from a unique construction wherein an effective image area narrower than an effective image area for a reflective document is exclusively assigned to a transmissive document so that, when a transmissive document is read, light transmitted through a differential area defined by the difference between the two exclusive areas is sensed in the form of a reference voltage and, in addition, a device for changing the timing for sensing the reference voltage is provided.

Various modifications will become possible for those skilled in the art after receiving the teachings of the present disclosure without departing from the scope thereof.

What is claimed is:

1. In a document reader capable of reading at least transmissive documents and for sensing, when reading a transmissive document, a reflection from a reference member of a predetermined color and having predetermined density and located outside an effective image area assigned to a reflective document on a glass platen as a reference voltage for output voltages of an image sensor and, based on the reference voltage, normalizing an output assoicated with each scanning, the improvement wherein an effective image area narrower than the effective area assigned to a reflective document is defined for a transmissive document so that, when a transmissive document is read with light passing therethrough, light transmitted through a differential area defined by a difference between the two effective image areas is sensed in the form of a reference voltage, and a timing for sensing the reference voltage is changed.

2. A document reader as claimed in claim 1, wherein the predetermined color is white.

3. A document reader as claimed in claim 1, wherein said image sensor comprises an array of charge coupled devices.

4. A document reader as claimed in claim 1, wherein means is provided for preventing a document from being laid in the differential area on said glass platen.

5. A document reader as claimed in claim 4, wherein said means comprises two diffusion plates which have no directivity and are adhered to each other in the differential area only.

* * * * *